(12) United States Patent
Potze

(10) Patent No.: US 7,574,331 B2
(45) Date of Patent: Aug. 11, 2009

(54) RECONSTRUCTION OF A SURFACE TOPOGRAPHY

(75) Inventor: Willem Potze, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 422 days.

(21) Appl. No.: 10/541,983

(22) PCT Filed: Dec. 24, 2003

(86) PCT No.: PCT/IB03/06299

§ 371 (c)(1),
(2), (4) Date: Jul. 11, 2005

(87) PCT Pub. No.: WO2004/063666

PCT Pub. Date: Jul. 29, 2004

(65) Prior Publication Data

US 2006/0055694 A1    Mar. 16, 2006

(30) Foreign Application Priority Data

Jan. 14, 2003  (EP) .................................. 03075110

(51) Int. Cl.
*G06F 17/10* (2006.01)
(52) U.S. Cl. ......................................... 703/2; 345/420
(58) Field of Classification Search .................... 703/2; 356/376; 345/420; 715/700; 700/189
See application file for complete search history.

(56) References Cited

U.S. PATENT DOCUMENTS 4,821,164 A * 4/1989 Swanson ........................ 702/5
5,831,736 A   11/1998 Lichtman et al.
6,950,786 B1 * 9/2005 Sonneland et al. ............. 703/2
7,062,353 B2 * 6/2006 Papiernik et al. ............ 700/189
2003/0137529 A1 * 7/2003 Kobbelt et al. .............. 345/700

OTHER PUBLICATIONS

Yi et al., An Invariant Performance Measure for Surface Reconstruction Using the Volume Between Two Surfaces, IEEE Transactions on Systems, Man, and Cybernetics—Part A: Systems and Humans, Sep. 1998, pp. 601-612.*
Zhao et al., H.-K. Fast Surface Reconstruction Using the Level Set Method, Proceedings of the IEEE Workshop on Variational and Level Set Methods in Computer Vision, Jul. 2001, pp. 194-201.*
Zhang et al., L. Single View Modeling of Free-Form Scenes, Proceedings of the 2001 IEEE Conference on Computer Vision and Pattern Recognition, 2001, pp. I-990-I-997.*
Fisk et al., C. Topographic Simulation as an Aid to Printed Circuit Board Design, Proceedings of the 4th Conf. on Design Automation DAC '67, Jan. 1967, pp. 17-1-17-23.*

* cited by examiner

*Primary Examiner*—Russell Frejd

(57) ABSTRACT

A system and method is provided for reconstructing a surface of an object. A system includes an input for receiving a 2-dimensional grid of measurements representing a surface of an object. Each grid point of the 2-dimensional grid of measurements includes information on the slope of the surface in the x-direction and y-direction. A processor selects a 2-dimensional part of the grid and fits a corresponding part of the surface to the measurements of all grid points in the selected part. For each grid point of the selected part, the fitting is based on both the corresponding first and second slope information. An output of the system provides a representation of at least the reconstructed surface part to a user.

13 Claims, 12 Drawing Sheets

RECONSTRUCTION OF A SURFACE TOPOGRAPHY

The invention relates to a method of reconstructing a surface of an object, where the object is represented by a 2-dimensional grid of measurements. For each grid point the measurements include corresponding information on a first slope of the surface in a first direction and a second slope of the surface in a different second direction. The invention further relates to software for executing the method and to a system for reconstructing the surface of an object.

Surfaces of objects, such as silicon wafers, can be reconstructed from measured slopes. The slopes are typically measured by scanning the surface along lines and measuring the slope. The measurements result in a 2-dimensional grid, where for each grid point a slope in a 'horizontal' direction and a slope in a 'vertical' direction is given. The measurements may be obtained using deflectometry, where light (e.g. from a laser) is projected onto the surface and an angle of reflection is measured, providing information on the slope. FIG. 1 shows a typical equidistant measurement grid with measurements points along the rectangular coordinate lines.

For many applications the actual surface (i.e. the topography of the surface) needs to be determined based on the measured slopes. Current reconstruction algorithms are based on carrying out a line integral along a path through the measurement grid. For example, by performing such a line integral along each 'horizontal' path (ie. each path parallel to one of the coordinate lines) the topography can be reconstructed. For each point along the path, the line integral uses the slope measured at the grid point in the direction of the path. In general the measured slopes contain measurement errors. Integration along the path accumulates all measurements errors in the slopes in the direction of the path. In this way, the topography of the surface determined at a grid point is therefore not determined uniquely but depends on the path chosen though the grid. For example, a line integral along a closed path like the path from (i,j) to (i+1, j), to (i+1, j+1) to (i, j+1) and back to (i,j) will in general not give the starting value for the surface topography.

In general, the measurements will not result in the regular equidistant measurement grid of FIG. 1 with measurements points along the rectangular coordinate lines. In practice, measurement scan lines are not always straight but may be curved. If a measurement system is used that obtains slope information only one direction during a scan, scanning needs to be performed in both directions. In such a case, measurement points in one direction may not be perfectly aligned with the measurement points in the other direction. To compensate for irregularities in the measurements, usually a calibration procedure is performed to correct the position of the measurement points to obtain the perfect equidistant rectangular measurement grid. Such calibration is usually based on interpolation that in itself introduces further errors in the measurements and is time-consuming.

It is an object of the invention to provide an improved method of reconstruction of a topography of a surface. It is a further object to provide software for performing such a method and a system for executing the method.

To meet the object of the invention, the method of reconstructing a surface of an object, where the object is represented by a 2-dimensional grid of measurements, where for each grid point the measurements include corresponding information on a first slope of the surface in a first direction and a second slope of the surface in a different second direction, includes selecting a 2-dimensional part of the grid and fitting a corresponding part of the surface to the measurements of all grid points in the selected part, where the fitting for each grid point of the selected part is based on both the corresponding first and second slope information. By performing a fitting based on all measured slopes of the selected part, the effect of a localized measurement error is significantly reduced to mainly the area of the error. According to the method, much more measurements are fully used for the reconstruction. Instead of performing an integration operation along a one-dimensional path, now a 2-dimensional fitting operation is performed, involving much more measured data. Moreover, instead of using only one measured slope of each involved grid point, now both slopes are used. This enables significant reduction in propagation of measurement errors. Preferably, a user can indicate the area in which accurate reconstruction according to the invention is desired. Outside the selected area, a conventional reconstruction may be carried out In a preferred embodiment, as described in the dependent claim 4, the fitting according to the invention is performed over substantially the entire surface represented by the grid measurements.

According to dependent claim 2, the fitting is performed though a least-square minimization operation. This is an effective way of minimizing fitting errors.

According to dependent claim 3, the least square minimization operation is performed by solving an equation that describes a shape of a soap film loaded with a pressure field equal to a divergence of a slope vector including the first and second slope information. The inventor had the insight that in this way the surface fitting according to the invention can be expressed in a way similar to describing a shape of a soap film loaded with a pressure field. This enables using known methods for determining such a soap film shape to determine the topography of the surface.

According to dependent claim 5, for each point of the grid the first and second slope are measured using deflectometry.

To meet the object of the invention, a computer program product operative to cause a processor to perform the steps of the method as claimed in claim 1.

To meet the object of the invention, a system for reconstructing a surface of an object includes an input for receiving a 2-dimensional grid of measurements representing a surface of an object, where for each grid point the measurements include corresponding information on a first slope of the surface in a first direction and a second slope of the surface in a different second direction; a processor for, under control of a program, selecting a 2-dimensional part of the grid and fitting a corresponding part of the surface to the measurements of all grid points in the selected part, where the fitting for each grid point of the selected part is based on both the corresponding first and second slope information; and an output for providing a representation of at least the reconstructed surface part.

According to dependent claim 8, the system includes a measurement unit for measuring for each measurement point of a measurement grid the corresponding first and second slope information.

According to dependent claim 9, the measuring is performed along non-straight lines; the measurement grid being directly used for the reconstruction. The method and system according to the invention perform a fitting that works as long as a connectivity between measurement points (analogous to the nodes belonging to a finite element in a FEM mesh) can be established. It is not required that the grid is neatly arranged, e.g. that the measurement points in the two directions form an equidistant x, y or r, .phi. grid). No calibration of the measurement grid to a grid used for the reconstruction is required, avoiding the introduction of additional errors.

According to dependent claim 10, the measurement unit includes a deflectometry measurement unit.

These and other aspects of the invention are apparent from and will be elucidated with reference to the embodiments described hereinafter.

Figure 5A:
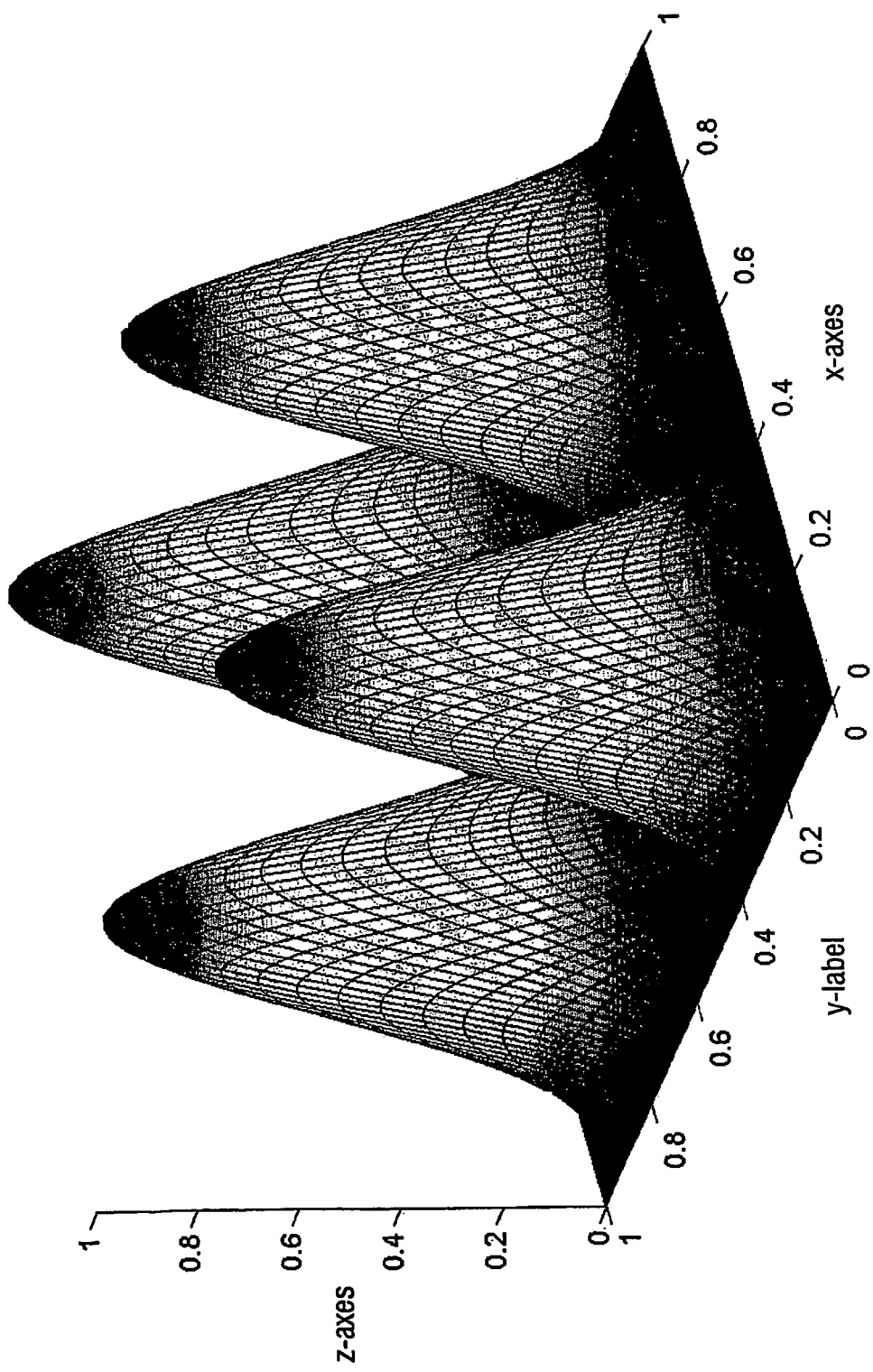
Figure 5B:
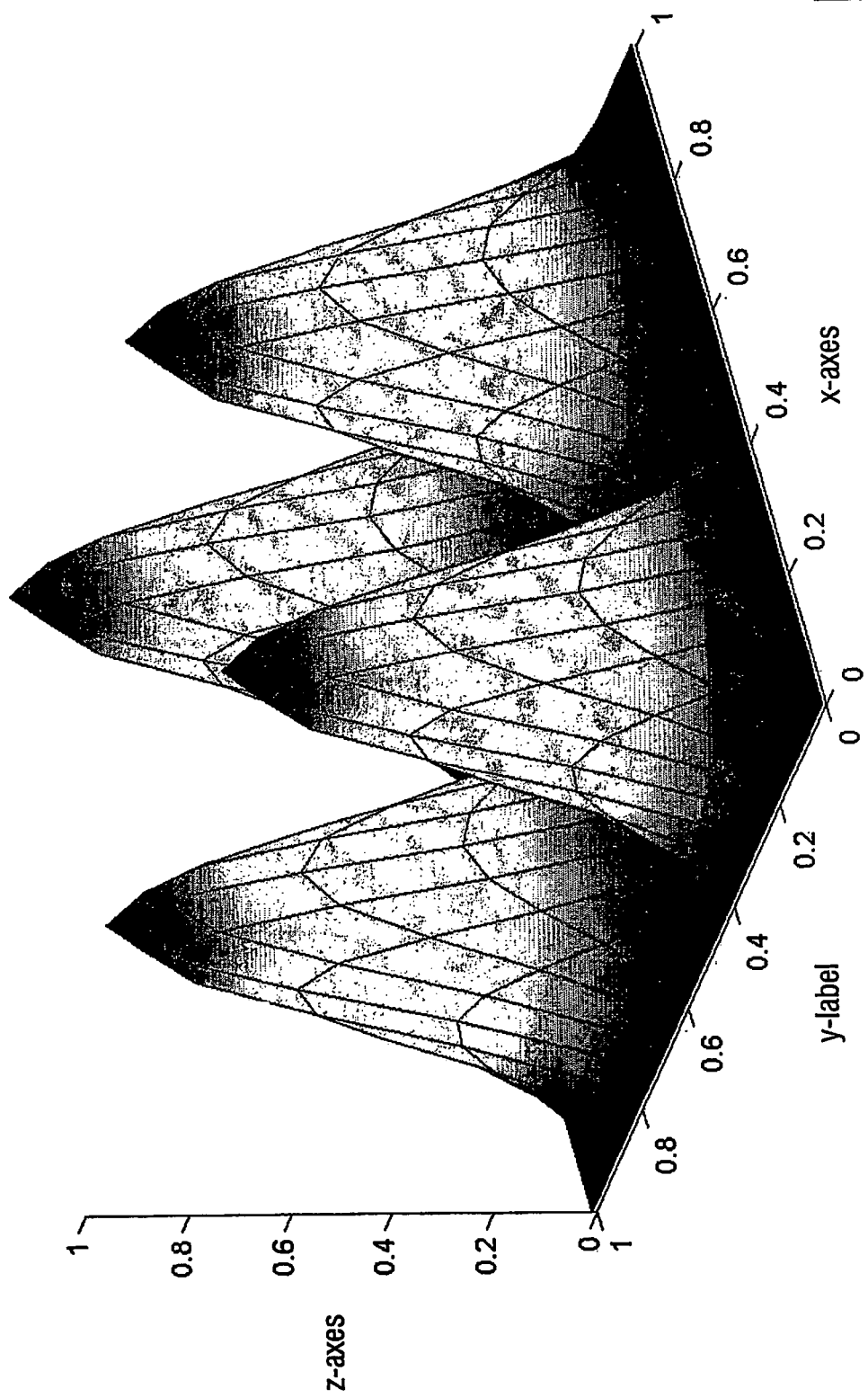
Figure 6:
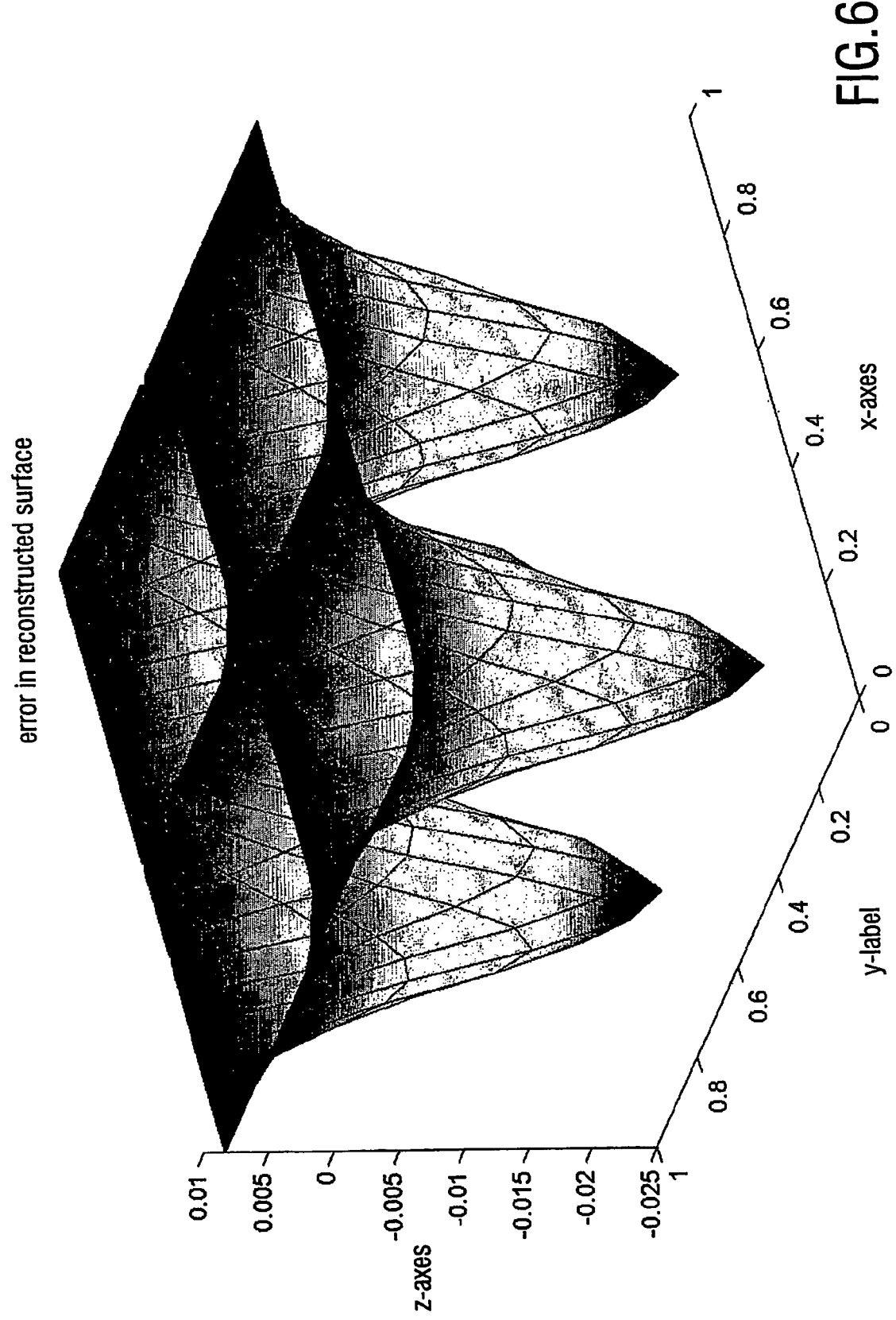
Figure 7A:
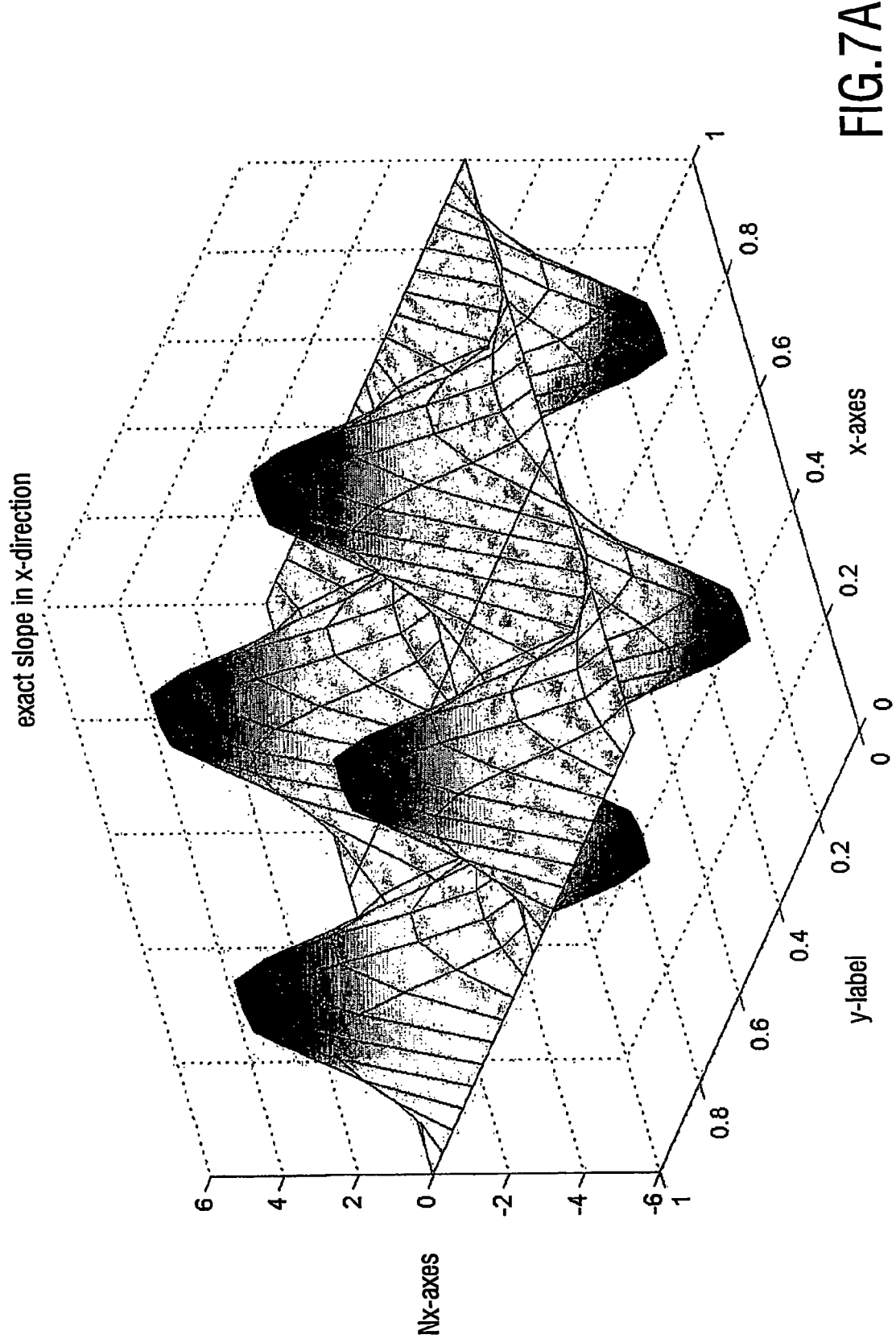
Figure 7B:
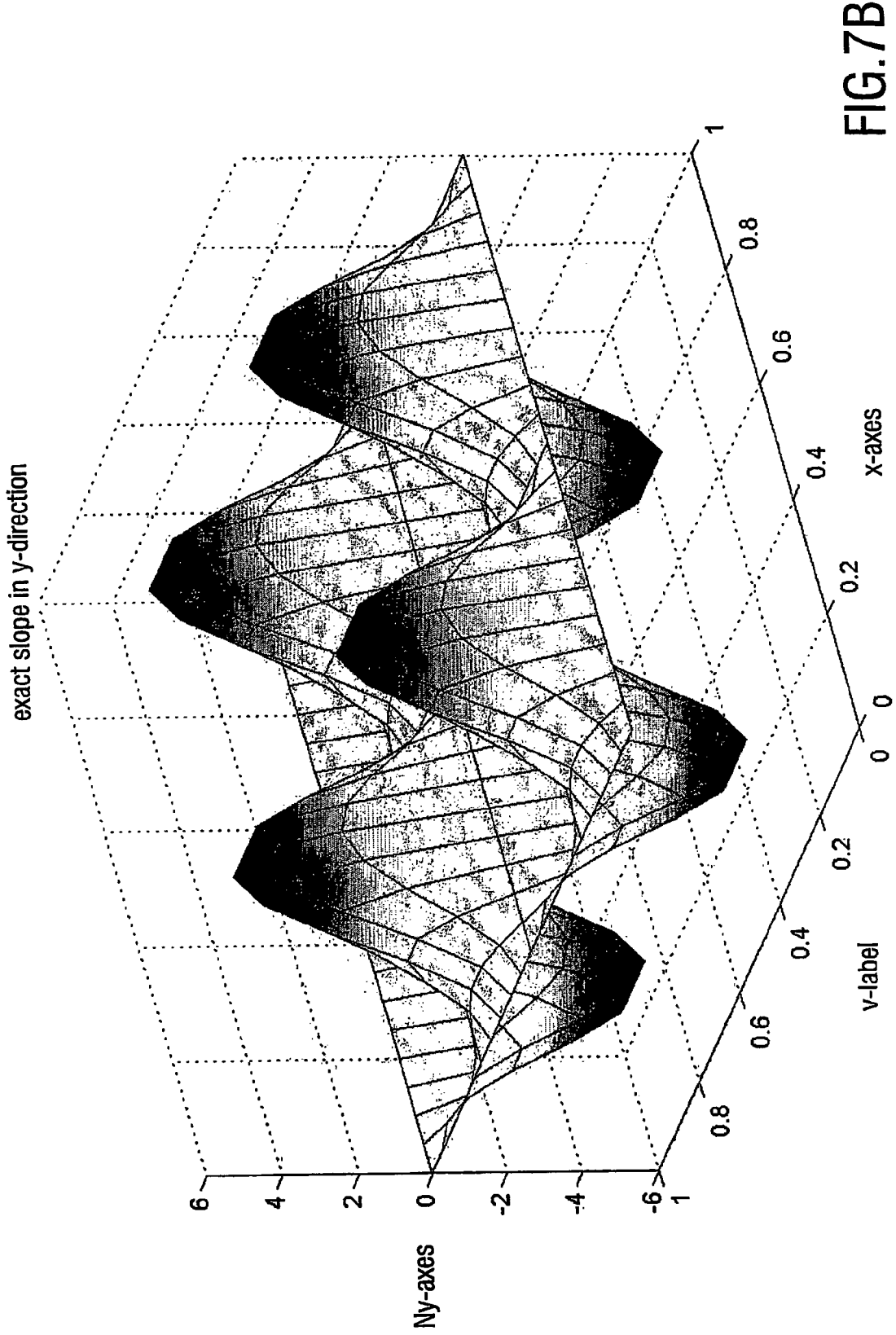
Figure 7C:
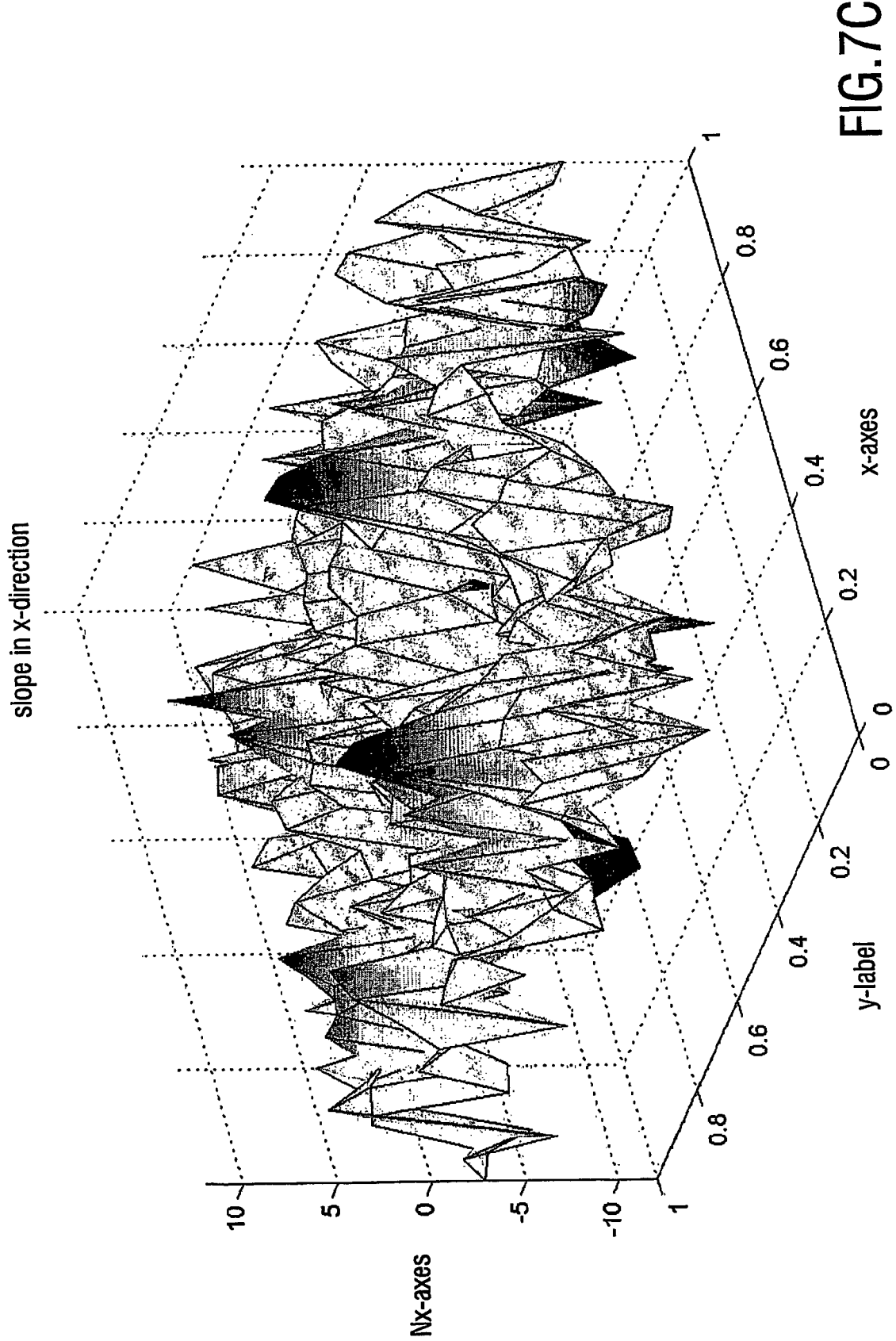
Figure 7D:
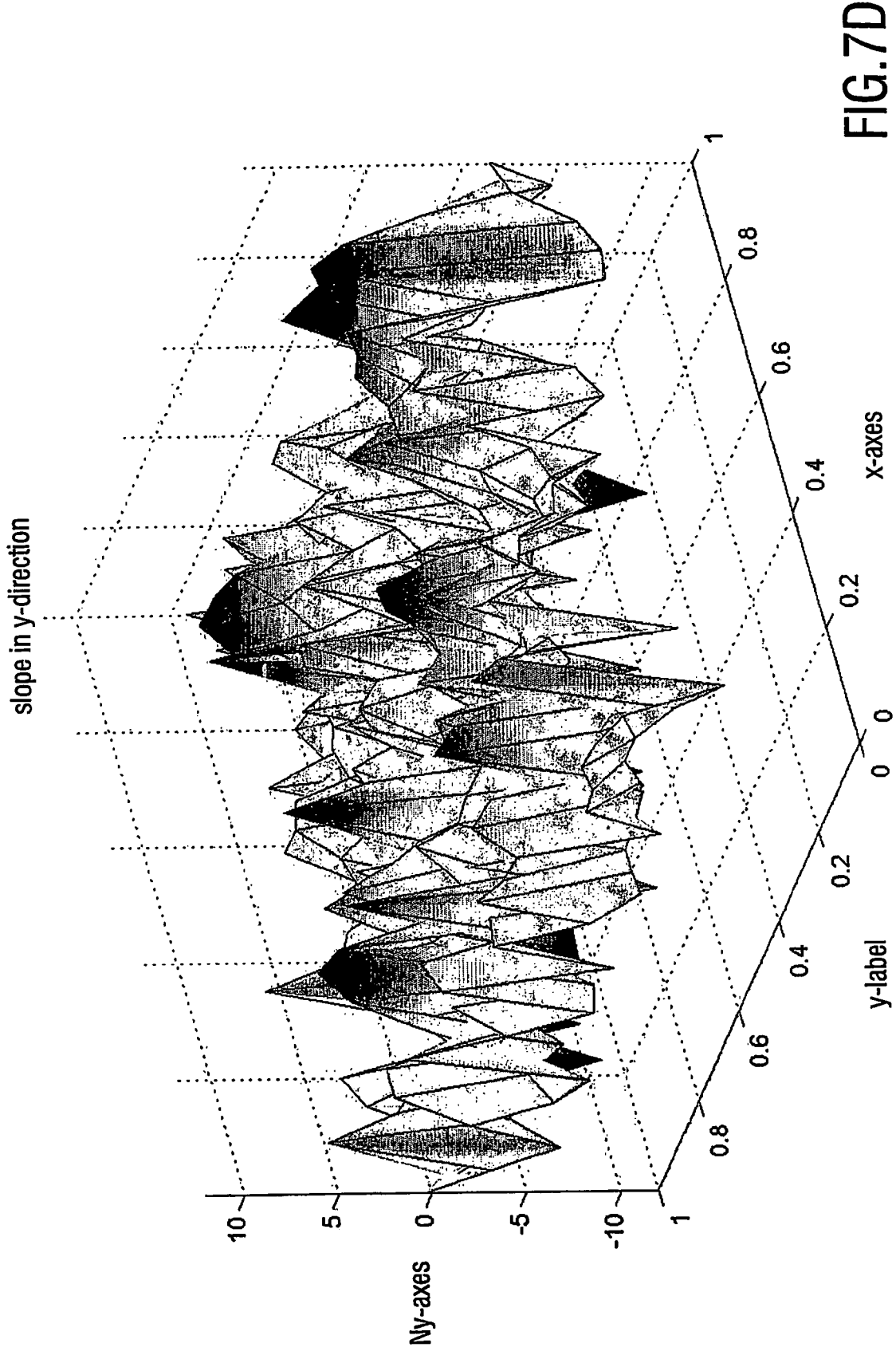
Figure 7E:
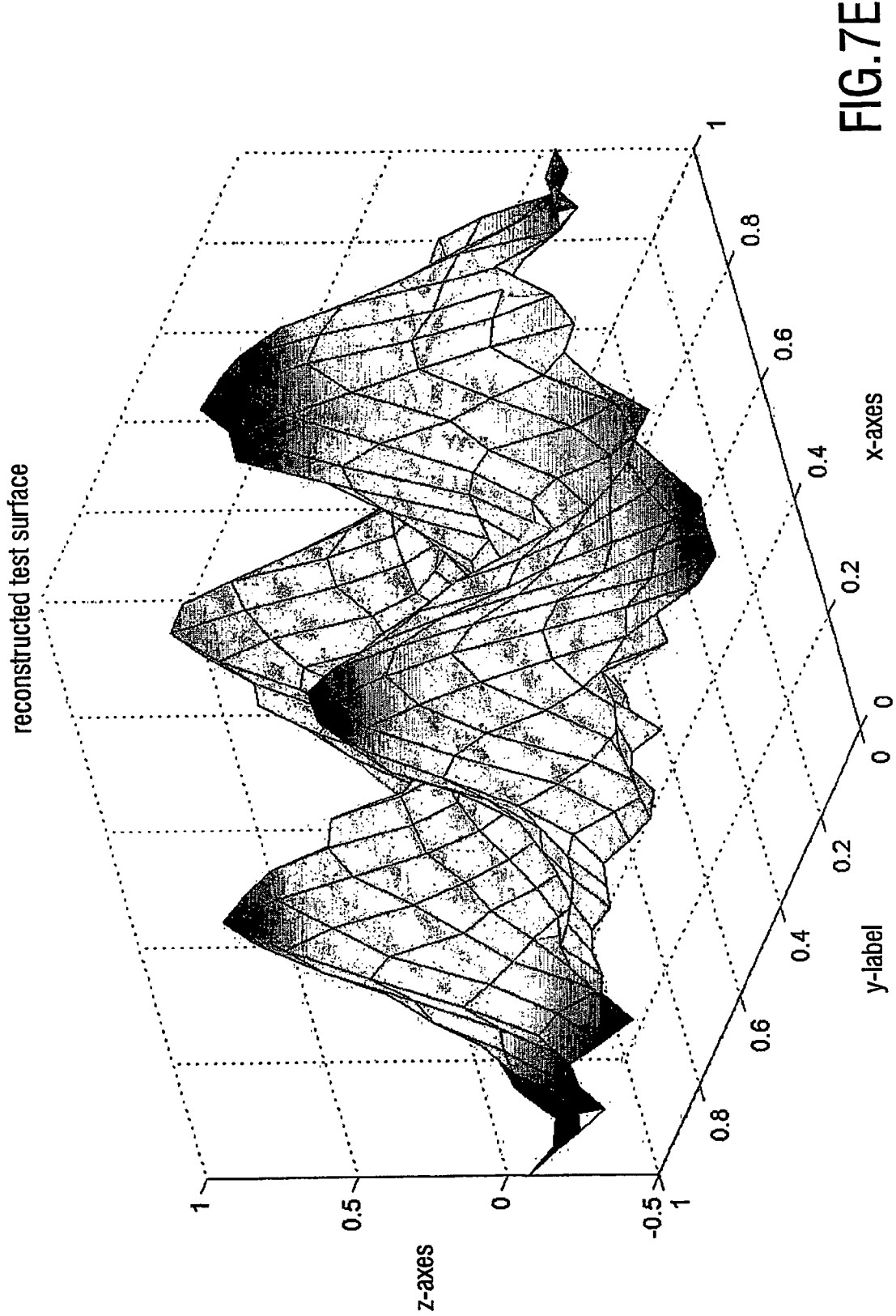
Figure 7F:
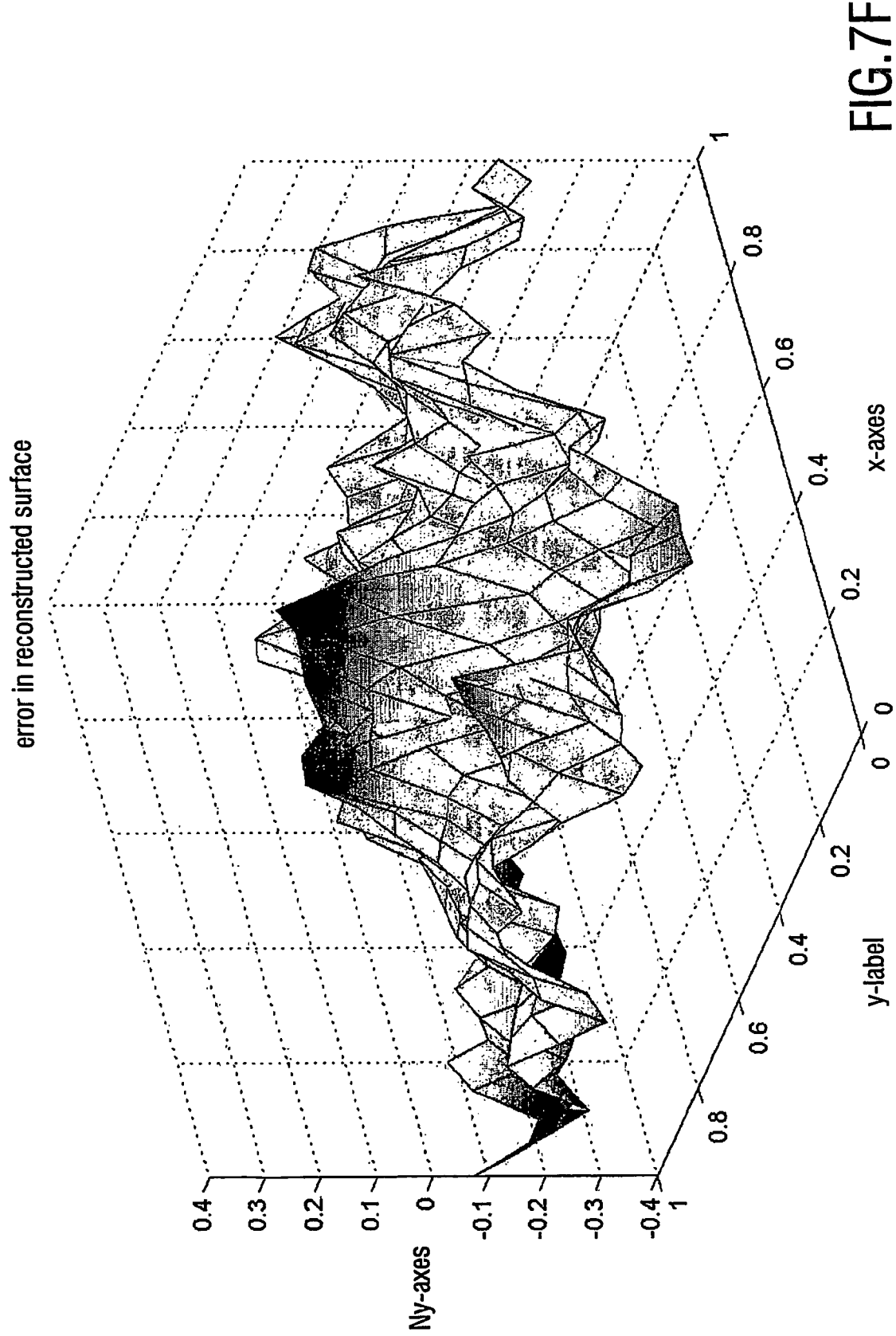

FIGS. 5A and B shown an exemplary initial surface and reconstructed surface obtained from exact slopes with the method according to the invention;

FIG. 6 shows the discretization error, i.e. difference between reconstructed and exact prescribed surface; and FIGS. 7A-7F show the exact slopes, slopes containing noise used to reconstruct the surface, reconstructed surface and error in reconstructed surface.

Figure 2:
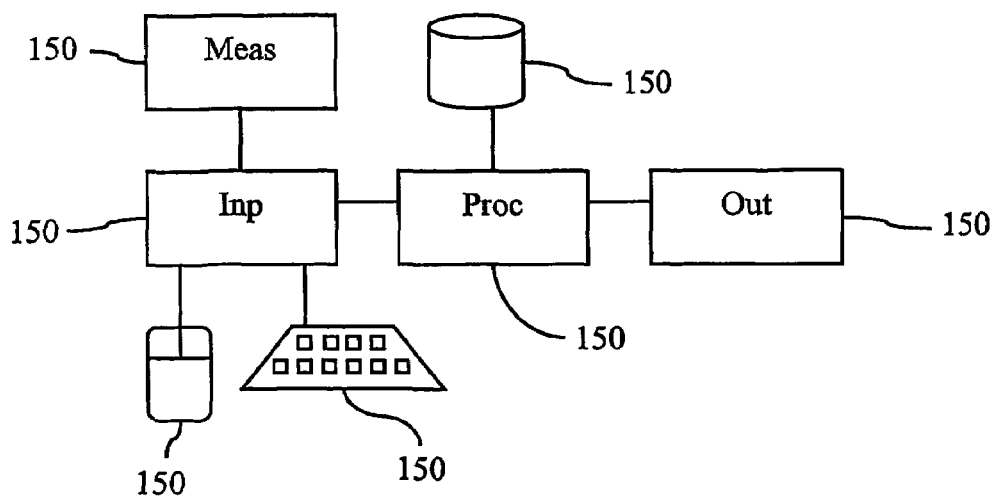
FIG. 2 shows a block diagram of a system in which the invention can be employed.

FIG. 2 shows a block diagram of a system in which the invention can be employed. In this exemplary system, the reconstruction of the surface topography is performed by a processor 100 that is loaded with a suitable program. The program may be stored in a permanent storage 150, such as a hard disk, and be executed from random access memory, such as DRAM (not shown). The processor operates on measurements received through an input 150. The input may be received from a measuring system 130. The measuring system 130 may be external to the system in which case the measurements may be received through a suitable communication system (e.g. wired or wireless LAN or wide area network, such as Internet). Preferably, the measuring system is part of the system for reconstruction of the surface. Advantageously, the measuring system is a deflectometry system, for example like the one described in U.S. Pat. 5,831,738, hereby included by reference. For the description it is assumed that measurements are provided for a 2-dimensional grid of measurements points, where for each point a slope in the x-direction and the y-direction is given. The method works equally well for other suitable coordinate systems, e.g. using an r, $\phi$ grid It is not required that the grid is neatly arranged, e.g. that the measurement points in the two directions form an equidistant x, y grid; it is sufficient that connectivity can be established between measurement points (analogous to the nodes belonging to a finite element in a FEM mesh).

The input 120 is also able to receive input from a user. Shown are input devices, such as a mouse 140 and keyboard 150. Output to a user may be supplied via an output device 160, that may include a display. In particular the input may enable the user to indicate an area of the surface (and/or grid) in which accurate reconstruction of the surface is required. For other areas, conventional reconstruction may take place. Such conventional reconstruction may be used to reconstruct the edge of the selected area. In the remainder, the reconstruction method according to the invention will be described.

Reconstruction method:

Consider a domain $D \subset R^2$ on which the topography of an unknown surface is measured with a deflectometry measurement system. Using this measurement system, the slopes $\vec{N}(\vec{x})$ of the unknown surface $z=z(\vec{x})$ are measured. If no measurement errors would occur, the unknown function that describes the surface satisfies $$\vec{\nabla} z(\vec{x}) = \vec{N}(\vec{x}), \ \vec{x} \in D \qquad (1)$$

Hence, the surface $z(\vec{x})$ is determined apart from a constant function $z=z_0$. A unique surface is obtained by prescribing the surface at some point $\vec{x}_0 \in D$, hence $z(\vec{x}_0)=z_0$.

In general the measured slopes contain measurement errors. Then, it is most likely that no function $z(\vec{x})$ exists that satisfies(1), because in all cases where $\mathrm{rot}(\vec{N})=\vec{\nabla}\times\vec{N}\neq 0$ no function exists that satisfies (1). However, it is possible to integrate (1) along a path $\Gamma(\vec{x}, \vec{x}_0)$ from $\vec{x}_0$ to $\vec{x}$ in the domain D to obtain values for the surface topography $$z(\vec{x}) = z_0 + \int_{\Gamma(\vec{x}, \vec{x}_0)} \vec{N} \cdot d\vec{s} \qquad (2)$$

Note, that if $\mathrm{rot}(\vec{N}) \neq 0$ these values are dependent on the path $\Gamma(\vec{x}, \vec{x}_0)$ and are therefore not unique. This is seen by carrying out the line integration (2) along a closed path $\Gamma(\vec{x}_0, \vec{x}_0)$ enclosing a surface $\Omega_\Gamma$ and using Stokes theorem hence $$\int_{\Gamma(\vec{x}_0, \vec{x})} \vec{N} \, d\vec{s} = \int_{\Omega_\Gamma} \int \mathrm{rot}(\vec{N}) \cdot \vec{n}_\Omega da \qquad (3)$$

where $\vec{n}_\Omega$ is the unit normal on $\Omega_\Gamma$ in $R^3$. Next, a method is proposed to find a unique function that approximately satisfies (1). Hence, the reconstructed surface obtained by the proposed method is independent of the fact that $\mathrm{rot}(\vec{N})$ is zero or not.

The unknown surface topography is approximated by a function $z(\vec{x})$ that satisfies (1) in a least squares sense, hence it is the function with $z(\vec{x}_0)=z_0$ that minimizes the functional $$J(z) = \int_D (\vec{\nabla} z - \vec{N}) \cdot (\vec{\nabla} z - \vec{N}) da \qquad (4)$$

where the integration is carried out over the measurement domain D. In order to be a minimum for every disturbance $\delta z(\vec{x})$ of $z(\vec{x})$ the minimizing function $z(\vec{x})$ has to satisfy $$\delta J(z) = \int_D \{(\vec{\nabla} z - \vec{N}) \cdot \vec{\nabla} \delta z\} da = 0, \ z(\vec{x}_0) = z_0 \qquad (5)$$

This last formulation of the solution of the minimization problem (4) is the weak formulation of $$\vec{\nabla} \cdot \vec{\nabla} z = \vec{\nabla} \cdot \vec{N}, \ \vec{x} \in D \qquad (6)$$

with boundary condition $$z(\vec{x}_0) = z_0; \ \vec{n} \cdot \vec{\nabla} z = \vec{n} \cdot \vec{N}, \ \vec{x} \in \partial D \tag{7}$$

where $\vec{n}$ is the unit normal at the boundary $\partial D$.

The formulation (6) is also directly found by taking the divergence of the left and right hand side of (1). The equation (6) also describes the solution of the mechanical problem of determining the shape of a soap film loaded with a pressure distribution equal to $\vec{\nabla} \cdot \vec{N}$. Note, that in the weak formulation (5) the order of differentiation is one, while it is two in the formulation (6). Hence, solving (5) instead of (6) means that it is sufficient that the unknown function $z(\vec{x})$ lies in the Sobolev space $$H^1(D) = \left\{ z : D \to \mathbb{R} \ \middle| \ \int_D \vec{\nabla} z \cdot \vec{\nabla} z \, da < \infty \right\}$$

and is not necessarily in $C^1(D)$ (first order derivatives exist and are continuous). Furthermore, in the formulation (6) the first order derivatives of the measured slope $\vec{N}$ must exist.

The advantage of solving (5) instead of carrying out the path integration (2) is that:

Both measured slope signals are used simultaneously to determine the topography of the measured surface.

All measured slope data is used to reconstruct the topography of the measured surface.

The determined topography is independent of an integration path which has to be chosen using the simple line integration methods.

Analogous to the loaded soap film problem, the effect of errors (inaccuracies) in the measured slope data on the determined topography is mainly limited to the location of the inaccuracy. With the line integration methods a local error propagates along the remaining integration path and hence has a larger effect (larger error) on the reconstructed topography.

Preferably, equation (5) is solved using a Finite Element Method (FEM). Of course other methods may be used to solve that equation, e.g. using a spectral method. Alternatively, equation (6) can be solved with e.g. a finite difference method. The formulation of the Finite Element Method to solve (5) will be carried out in Cartesian coordinates. For other coordinate systems the formulation is analogous to the presently discussed one.

Figure 1:
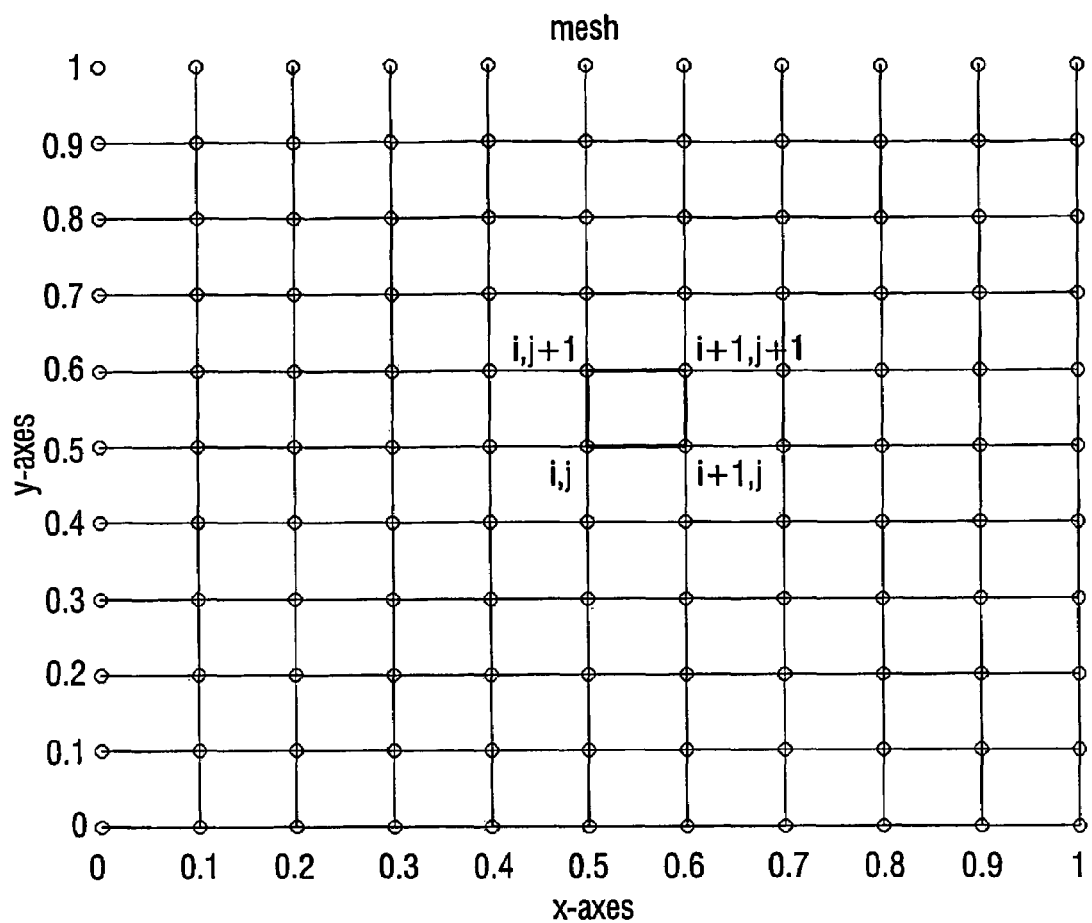
FIG. 1 shows a quadrilateral finite element mesh corresponding to the measurement grid.
Figure 3:
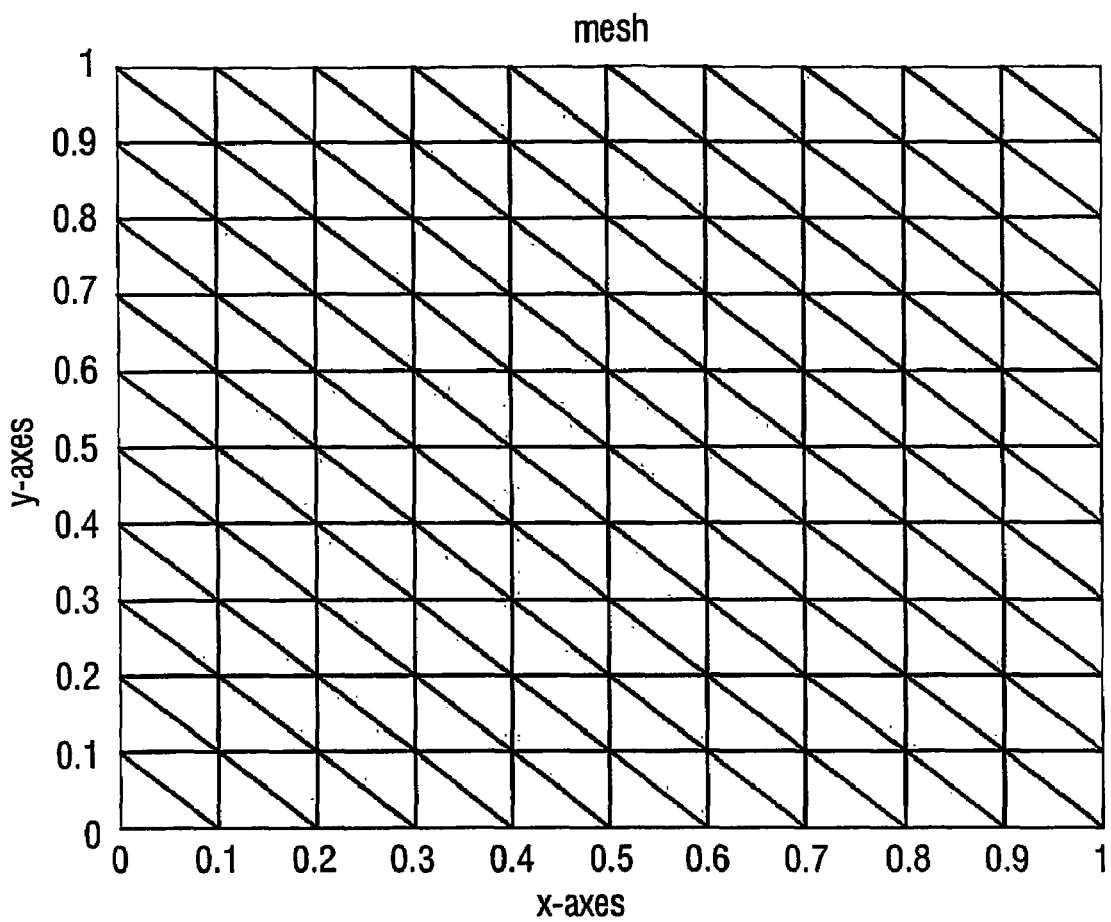
FIG. 3 shows a finite element mesh consisting of triangular elements.

Consider a Cartesian coordinate system (x, y, z). Suppose that the measurement grid $D_M \subset D \subset \mathbb{R}^2$ consists of $n \cdot m$ discrete points $(x_{ij}, y_{ji})$, $i=1 \ldots n$, $j=1 \ldots m$, with $x_{i,j} < x_{i+1,j}$ and $y_{j,i} < y_{j+1,i}$. With these discrete measurement points a quadrilateral finite element mesh is established by connecting the points $(x_{i,j}, y_{j,i})$, $(x_{i+1,j}, y_{j,i+1})$, $(x_{i+1,j+1}, y_{j+1,j+1})$ and $(x_{i,j+1}, y_{i+1,j})$ for $i=1 \ldots n-1$ and $j=1 \ldots m-1$, as shown in FIG. 1. Hence, the measurement domain is divided in $(n-1) \cdot (m-1)$ quadrilateral elements $D_e$ using the nodes $(x_{ij}, y_{ji})$ of the measurement grid. The choice of dividing the measurement domain D into quadrilateral elements is not a restriction. For instance, if each quadrilateral element is divided in two triangles, as shown in FIG. 3, a finite element mesh consisting of triangular elements can be created. In that case the number of elements increases with a factor 2.

The unknown surface topography $z=z(x,y)$ is written as a linear combination of a finite set of approximating functions $\phi_k(x,y)$ $k=1 \ldots n \cdot m$, hence $$z(x, y) = \sum_{k=1}^{m \cdot n} a_k \varphi_k(x, y) \tag{8}$$

Substitution of (8) in (3) and minimizing the functional J(z) with respect to the coefficients $a_k$, or equivalently substitution of (8) in (4) with $\delta z = \phi_l(x, y)$, yields $$\sum_{k=1}^{m \cdot n} \int_D \int \vec{\nabla} \varphi_k \cdot \vec{\nabla} \varphi_l \, da * a_k = \int_D \int \vec{N} \cdot \vec{\nabla} \varphi_l \, da, \ l = 1 \ldots m \cdot n \tag{9}$$

This singular set of linear equations is made regular by replacing the $l^{th}$ equation, where $l$ is the index at which $|\phi_l(\vec{x}_0)|$ has a maximum, by the condition $z(\vec{x}_0) = z_0$. The solution of this set of linear equations determines the approximation (8) of the measured surface topography.

In the finite element approximation the subdivision of the measurement domain D in the finite elements $D_e$ is used to write the integrals in (9) as $$\int_D \int \vec{\nabla} \varphi_k \cdot \vec{\nabla} \varphi_l \, da = \sum_e \int_{D_e} \int \vec{\nabla} \varphi_k \cdot \vec{\nabla} \varphi_l \, da \tag{10}$$

$$\int_D \int \vec{N} \cdot \vec{\nabla} \varphi_l \, da = \sum_e \int_{D_e} \int \vec{N} \cdot \vec{\nabla} \varphi_l \, da \tag{11}$$

Figure 4:
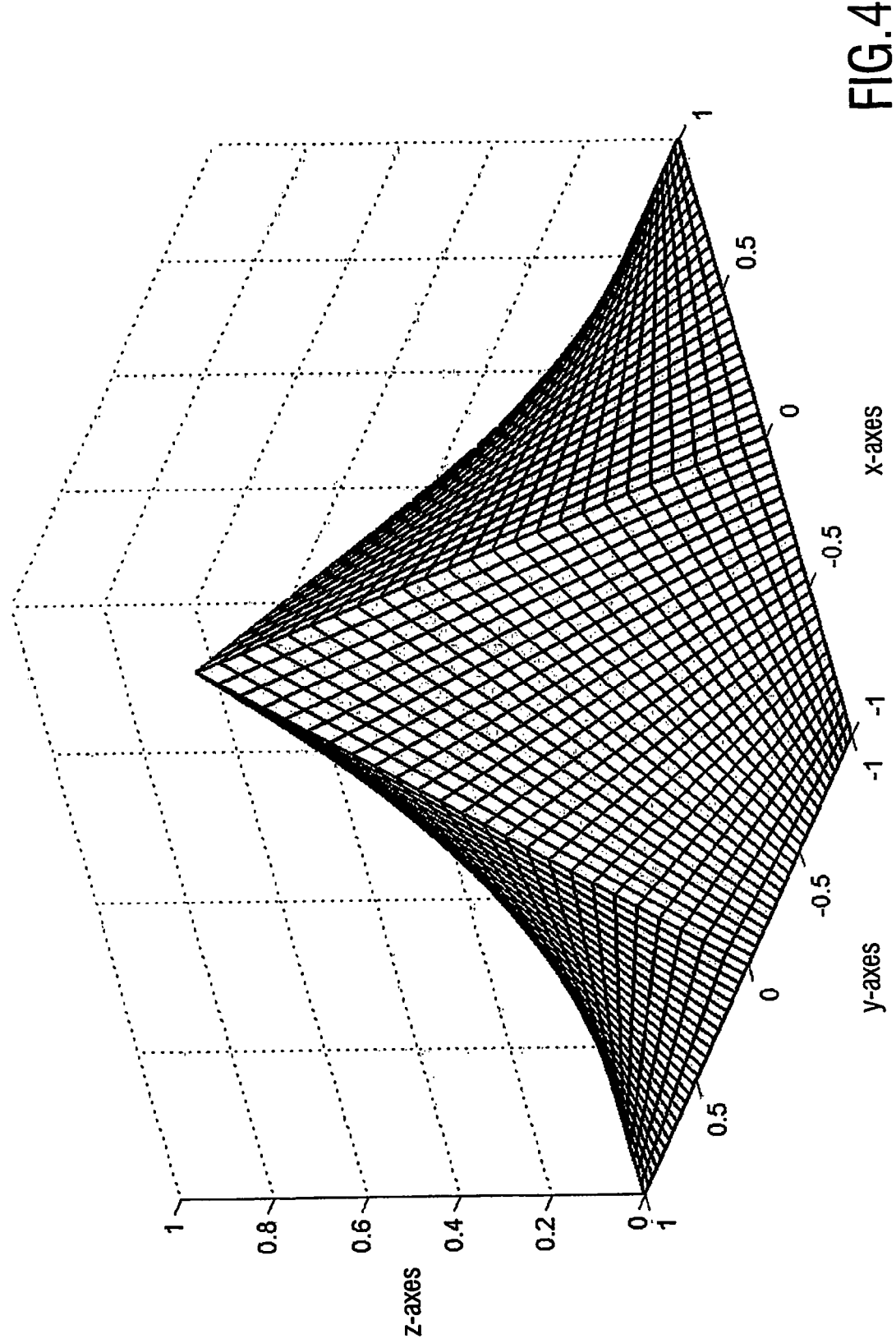
FIG. 4 illustrates a piecewise bilinear base function on element mesh shown on the 4 elements.

The functions $\phi_k$ are chosen to be bi-linear per element and have the value 1 in one node and 0 in all other nodes, as shown in FIG. 4. FIG. 4 illustrates a piecewise bilinear base function on element mesh shown on the 4 elements: $[-1,0] \times [-1,0]$, $[0,1] \times [-1,0]$, $[0,1] \times [0,1]$ and $[-1,0] \times [0,1]$.

For the evaluation of the integrals over the elements an iso-parametric transformation of an actual quadrilateral element to the standard quadrilateral element is carried out $$\vec{x}(\vec{\xi}) = \sum_{i=1}^{4} \vec{x}_{k(i)} \varphi_{k(i)}(\vec{\xi}) \tag{11}$$

where $\vec{x} = (x,y)^T$, $\vec{\xi} = (\xi, \eta)^T$ and the node number function $k(i)$ is such that the actual 4 nodes of an element are used. Then an integral of a function $f(\vec{x})$ over an element $D_e$ is seen to be $$\int_{D_e} \int f(\vec{x}) \, da = \int_{-1}^{1} \int_{-1}^{1} f(\vec{x}(\vec{\xi})) J(\vec{\xi}) \, d\xi \, d\eta \tag{12}$$

where $J(\vec{\xi})$ is the determinant of the Jacobian matrix $$F = \frac{\partial \vec{x}}{\partial \vec{\xi}}.$$

The bilinear approximating or basis functions $\phi_k(\xi,\eta)$ are seen to be $$\varphi_1(\xi, \eta) = \frac{1}{4}(1-\xi)(1-\eta) \tag{13}$$

$$\varphi_2(\xi, \eta) = \frac{1}{4}(1+\xi)(1-\eta) \tag{14}$$

$$\varphi_3(\xi, \eta) = \frac{1}{4}(1+\xi)(1+\eta) \tag{15}$$

$$\varphi_4(\xi, \eta) = \frac{1}{4}(1-\xi)(1+\eta) \tag{16}$$

and their gradients are $$\frac{\partial \varphi_1(\xi, \eta)}{\partial \xi} = \frac{-1}{4}(1-\eta); \frac{\partial \varphi_1(\xi, \eta)}{\partial \eta} = \frac{-1}{4}(1-\xi) \tag{17}$$

$$\frac{\partial \varphi_2(\xi, \eta)}{\partial \xi} = \frac{1}{4}(1-\eta); \frac{\partial \varphi_2(\xi, \eta)}{\partial \eta} = \frac{-1}{4}(1+\xi) \tag{18}$$

$$\frac{\partial \varphi_3(\xi, \eta)}{\partial \xi} = \frac{1}{4}(1+\eta); \frac{\partial \varphi_3(\xi, \eta)}{\partial \eta} = \frac{1}{4}(1+\xi) \tag{19}$$

$$\frac{\partial \varphi_4(\xi, \eta)}{\partial \xi} = \frac{-1}{4}(1+\eta); \frac{\partial \varphi_4(\xi, \eta)}{\partial \eta} = \frac{1}{4}(1-\xi) \tag{20}$$

In the evaluation of the integrals in the right hand side of (9), integrals involving measured slope values occur. Using (10), (11) and (12) these integrals are transformed to integrals over the standard quadrilateral element. On the standard element the variation of the slope vector is approximated with a bilinear function $$\vec{N}(\vec{x}(\vec{\xi})) = \sum \vec{N}(\vec{x}_{k(i)})\varphi_{k(i)}(\vec{\xi}) \tag{21}$$

Substitution of (21) in the expression obtained by (10), (11) and (12) yields integrals of the form $$\int_{-1}^{1}\int_{-1}^{1} \varphi_k(\xi,\eta)\frac{\partial \varphi_l(\xi,\eta)}{\partial \xi} J(\xi,\eta) d\xi d\eta \tag{22}$$

$$\int_{-1}^{1}\int_{-1}^{1} \varphi_k(\xi,\eta)\frac{\partial \varphi_l(\xi,\eta)}{\partial \eta} J(\xi,\eta) d\xi d\eta \tag{23}$$

These integrals can be evaluated analytically. However, in the present work a 4 point Gaussian quadrature rule is applied. The integration points and weights of this method are $$(\xi,\eta)_1 = \left(\frac{-1}{3}\sqrt{3}, \frac{-1}{3}\sqrt{3}\right); w_1 = 1 \tag{24}$$

$$(\xi,\eta)_2 = \left(\frac{1}{3}\sqrt{3}, \frac{-1}{3}\sqrt{3}\right); w_2 = 1 \tag{25}$$

$$(\xi,\eta)_3 = \left(\frac{1}{3}\sqrt{3}, \frac{1}{3}\sqrt{3}\right); w_3 = 1 \tag{26}$$

$$(\xi,\eta)_4 = \left(\frac{-1}{3}\sqrt{3}, \frac{1}{3}\sqrt{3}\right); w_4 = 1 \tag{27}$$

Carrying out all integrations, the element matrices and vectors are assembled in the large matrix and vector. Now the condition $z(\vec{x}_0)=z_0$ is incorporated into the equations, as discussed before and the resulting set of linear discrete equations $$A_{lk}a_k = f_l \tag{28}$$

has to be solved. Several techniques exist to solve (28). It is preferred to use a Gaussian elimination procedure (LU decomposition), which is a direct method. If the system of equations is very large, iterative procedures can be used to solve (28), e.g. Gauss-Seidel, Multigrid, etc.

EXAMPLES

In this section the accuracy and the efficiency of the proposed method is investigated using virtual measurement data.

Suppose the measurement domain is $D=[0,1]\times[0,1] \subset R^2$. The test surface is $$z(x,y) = \sin^2(2\pi x)\sin^2(2\pi y) \tag{29}$$

with exact slope vector $$\vec{N}\begin{pmatrix} \partial z/\partial x \\ \partial z/\partial y \end{pmatrix} = \begin{pmatrix} 4\pi\sin(2\pi x)\cos(2\pi x)\sin^2(2\pi y) \\ 4\pi\sin^2(2\pi x)\sin(2\pi y)\cos(2\pi y) \end{pmatrix} \tag{30}$$

The initial surface and reconstructed surface obtained from the exact slopes (30) with the presently proposed method using an equidistant measurement grid of 21×21 points are shown in FIGS. 5A and B, respectively. The discretization error, i.e. difference between reconstructed and exact prescribed surface, is shown in FIG. 6. The reconstructed surface approximates the initial surface very good. Next, the accuracy of the obtained reconstructed surface is investigated when the measurement grid is varied, and/or noise is added to the slope vector.

First, the discretization error to reconstruct the prescribed test surface with a finite discrete mesh is investigated. The discretization error to reconstruct the prescribed test surface with a finite discrete mesh are shown in Table 1, where $\|f\|_{L_2}$ is the $L_2$ norm $$\|f\|_{L_2} = \sqrt{\int\int_D f^2 da} \tag{31}$$

and $\|f\|_\infty$ is the infinity (or max) norm $$\|f\|_\infty = \max_{\vec{x}_{i,j}} |f(\vec{x}_{i,j})| \tag{32}$$

The discretization error reduces quadratically with the mesh size (i.e. a typical dimension of and element, e.g. the radius of the largest circle that fits in an element). This behavior is expected using the bi-linear elements.

TABLE 1

Discretization error to reconstruct the prescribed test surface.

| n | m | $\|z_h - z_{exact}\|_\infty$ | $\|z_h - z_{exact}\|_{L_2}$ |
|---|---|---|---|
| 10 | 10 | 76.808e-3 | 37.788e-3 |
| 20 | 20 | 24.838e-3 | 9.2565e-3 |
| 40 | 40 | 6.1787e-3 | 2.3027e-3 |
| 80 | 80 | 1.5428e-3 | 0.57495e-3 |

Secondly, using the same mesh (measurement grid) white noise (random values) with an amplitude equal to the amplitude of the slope values is added to the slope vector $$\vec{N}(\vec{x}) \rightarrow \vec{N}(\vec{x}) + a \begin{pmatrix} r_x(\vec{x}) \\ r_y(\vec{x}) \end{pmatrix} \text{ where } a = \max_{\vec{x},i}(N_i(\vec{x})) - \min_{\vec{x},i}(N_i(\vec{x})) \tag{33}$$

and $r_x(\vec{x})$ and $r_y(\vec{x})$ generate random values in the range $$\left[-\frac{1}{2}, \frac{1}{2}\right].$$

In this case the difference between the reconstructed and the initial test surface is caused by a discretization error and by the noise in the slope data. FIG. 7 shows: Original slopes: (A) in x-direction, (B) in y-direction; used slopes to reconstruct surface: (C) slope with noise in x-direction, (D) slope with noise in y-direction; and reconstructed surface (E) and error in reconstructed surface (F), for-a grid consisting of 21×21 points. Even using the slopes with the added white noise having the same amplitude as that of the original slopes, the reconstructed surface approximates the original surface fairly good. As the problem is linear in the known slopes, the difference caused by the noise in the slope vector is linear with the amplitude of the noise. The difference between the reconstructed surface and the initial test surface is shown in Table 2. As follows from Table 1 and Table 2, the difference between the reconstructed and original surfaces is mainly caused by the noise in the slopes. If the amplitude of the noise is halved, also the difference between the reconstructed and original surface halves. Note, that the behavior of the noise in the two considered cases of different amplitudes is different, because of the not repeatable random generated values.

TABLE 2

Difference between reconstructed and initial test surface, when noise is added to slope vectors.

| | | noise amplitude = a | | noise amplitude = 0.5a | |
|---|---|---|---|---|---|
| n | m | $\|z_h - z_{exact}\|_\infty$ | $\|z_h - z_{exact}\|_{L_2}$ | $\|z_h - z_{exact}\|_\infty$ | $\|z_h - z_{exact}\|_{L_2}$ |
| 10 | 10 | 0.69997 | 0.24197 | 0.28433 | 0.08341 |
| 20 | 20 | 0.41839 | 0.12651 | 0.216 | 0.061669 |
| 40 | 40 | 0.31338 | 0.075538 | 0.13551 | 0.042426 |
| 80 | 80 | 0.18825 | 0.050282 | 0.084235 | 0.018521 |

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in a claim. The invention can be implemented by means of hardware comprising several distinct elements, and by means of a suitably programmed computer. Where the system/device/apparatus claims enumerate several means, several of these means can be embodied by one and the same item of hardware. The computer program product may be stored/distributed on a suitable medium, such as optical storage, but may also be distributed in other forms, such as being distributed via the Internet or wireless telecommunication systems.

The invention claimed is:

1. A method of reconstructing a surface of an object; the object being represented by a 2-dimensional grid of measurements, where for each grid point the measurements include corresponding information on a first slope of the surface in a first direction and a second slope of the surface in a different second direction; the method including:
   in a processor, selecting a 2-dimensional part of the grid over which an accurate reconstruction may be carried out,
   fitting a corresponding part of the surface to the measurements of all grid points in the selected part, thereby significantly reducing the effect of a localized measurement error to the area of the selected 2-dimensional part, and
   providing a representation of at least the reconstructed surface part,
   where the fitting for each grid point of the selected part is based on both the corresponding first and second slope information.

2. A method as claimed in claim 1, including performing the fitting through a least-square minimization operation.

3. A method as claimed in claim 2, including performing the least square minimization operation by solving an equation that describes a shape of a soap film loaded with a pressure field equal to a divergence of a slope vector including the first and second slope information.

4. A method as claimed in claim 1, wherein the selected part of the grid is substantially the entire grid.

5. A method as claimed in claim 1, including measuring for each point of the grid the first and second slope using deflectometry.

6. A computer-readable storage medium comprising computer-readable instructions operative to cause a processor to perform the steps of the method as claimed in claim 1.

7. A system for reconstructing a surface of an object including:
- an input for receiving a 2-dimensional grid of measurements representing a surface of an object, where for each grid point the measurements include corresponding information on a first slope of the surface in a first direction and a second slope of the surface in a different second direction;
- a processor, under control of a program, for
  - (a) selecting a 2-dimensional part of the grid over which an accurate reconstruction may be carried out, and
  - (b) fitting a corresponding part of the surface to the measurements of all grid points in the selected part, thereby significantly reducing the effect of a localized measurement error to the area of the selected 2-dimensional part, where the fitting for each grid point of the selected part is based on both the corresponding first and second slope information; and
- an output for providing a representation of at least the reconstructed surface part.

8. A system as claimed in claim 7, wherein the system includes a measurement unit for measuring for each measurement point of a measurement grid the corresponding first and second slope information.

9. A system as claimed in claim 8, wherein the measuring is performed along non-straight lines; the measurement grid being directly used for the reconstruction.

10. A system as claimed in claim 8, wherein the system the measurement unit includes a deflectometry measurement unit.

11. A method of reconstructing a surface of an object; the object being represented by a 2-dimensional grid of measurements, where for each grid point the measurements include corresponding information on a first slope of the surface in a first direction and a second slope of the surface in a different second direction; the method including:
- in a processor selecting a 2-dimensional part of the grid over which an accurate reconstruction may be carried out, and
- fitting a corresponding part of the surface to the measurements of all grid points in the selected part, thereby significantly reducing the effect of a localized measurement error to the area of the selected 2-dimensional part, where the fitting for each grid point of the selected part is based on both the corresponding first and second slope information,
- whereby said fitting is performed through a least-square minimization operation by solving an equation that describes a shape of a soap film loaded with a pressure field equal to a divergence of a slope vector including the first and second slope information, and
- providing a representation of at least the reconstructed surface part.

12. A system for reconstructing a surface of an object including:
- an input for receiving a 2-dimensional grid of measurements representing a surface of an object, where for each grid point the measurements include corresponding information on a first slope of the surface in a first direction and a second slope of the surface in a different second direction;
- a processor, under control of a program, for
  - selecting a 2-dimensional part of the grid over which an accurate reconstruction may be carried out, and
  - fitting a corresponding part of the surface to the measurements of all grid points in the selected part, thereby significantly reducing the effect of a localized measurement error to the area of the selected 2-dimensional part, where the fitting for each grid point of the selected part is based on both the corresponding first and second slope information; and
- an output for providing a representation of at least the reconstructed surface part,
- wherein the system includes a measurement unit for measuring for each measurement point of a measurement grid the corresponding first and second slope information and wherein the measurement unit includes a deflectometry measurement unit.

13. A computer program product comprising one or more computer-readable storage media having thereon computer executable instructions that, when executed by one or more processors of a system for reconstructing the surface of an object, cause the system to perform the following:
- select a 2-dimensional part of the grid over which an accurate reconstruction may be carried out;
- fit a corresponding part of the surface to the measurements of all grid points in the selected part, thereby significantly reducing the effect of a localized measurement error to the area of the selected 2-dimensional part; and
- provide a representation of at least the reconstructed surface part, where the fitting for each grid point of the selected part is based on both the corresponding first and second slope information.

* * * * *